(12) United States Patent
Oikawa

(10) Patent No.: US 10,315,258 B2
(45) Date of Patent: Jun. 11, 2019

(54) CUTTING INSERT AND CUTTING TOOL

(71) Applicant: TUNGALOY CORPORATION, Yoshima-Kogyodanchi, Iwaki-shi (JP)

(72) Inventor: Yuki Oikawa, Iwaki (JP)

(73) Assignee: TUNGALOY CORPORATION, Iwaki-shi, Fukushima (JP)

(*) Notice: Subject to any disclaimer, the term of this patent is extended or adjusted under 35 U.S.C. 154(b) by 339 days.

(21) Appl. No.: 15/120,789

(22) PCT Filed: Feb. 25, 2015

(86) PCT No.: PCT/JP2015/055479
§ 371 (c)(1),
(2) Date: Aug. 23, 2016

(87) PCT Pub. No.: WO2015/129769
PCT Pub. Date: Sep. 3, 2015

(65) Prior Publication Data
US 2017/0008100 A1    Jan. 12, 2017

(30) Foreign Application Priority Data
Feb. 26, 2014    (JP) .................. 2014-034881

(51) Int. Cl.
*B23C 5/20* (2006.01)
*B23C 5/02* (2006.01)
(Continued)

(52) U.S. Cl.
CPC .............. *B23C 5/207* (2013.01); *B23C 5/06* (2013.01); *B23C 2200/0494* (2013.01);
(Continued)

(58) Field of Classification Search
CPC ...... B23C 2200/0494; B23C 2200/208; B23C 2200/365; B23C 5/207; B23C 2200/28;
(Continued)

(56) References Cited

U.S. PATENT DOCUMENTS 5,460,464 A * 10/1995 Arai ..................... B23C 5/109
407/114
5,707,185 A    1/1998 Mizutani
(Continued)

FOREIGN PATENT DOCUMENTS

EP    0914227 A1    5/1999
EP    1872889 A1    1/2008
(Continued)

OTHER PUBLICATIONS

International Search Report dated Mar. 31, 2015 issued in counterpart International (PCT) Application (No. PCT/JP2015/055479).
(Continued)

*Primary Examiner* — Sara Addisu
(74) *Attorney, Agent, or Firm* — Studebaker & Brackett PC

(57) ABSTRACT

A cutting insert has an upper surface (21), a lower surface (91) and a side surface (61) that connects the two surfaces. A cutting edge is formed at an intersecting edge between the upper surface (21) and the side surface (61). The cutting edge includes at least a major cutting edge (33), a corner edge (34) connected to the major cutting edge (33), and a curved wiper edge (35) located on the opposite side of the major cutting edge (33) across the corner edge (34). A first angle θ made by the major cutting edge (33) and the chord of the wiper edge (35) is 155°≤θ<180°, and a positive land is formed in the wiper edge (35). The cutting edge may further include an inner cutting edge (36) located on an opposite side of the corner edge (34) across the wiper edge (35).

17 Claims, 7 Drawing Sheets

(51) Int. Cl.
*B23B 27/16* (2006.01)
*B23C 5/06* (2006.01)

(52) U.S. Cl.
CPC .. *B23C 2200/208* (2013.01); *B23C 2200/365* (2013.01); *B23C 2200/366* (2013.01); *B23C 2210/045* (2013.01); *B23C 2220/28* (2013.01); *B23C 2220/44* (2013.01)

(58) Field of Classification Search
CPC ............ B23C 2200/44; B23C 2200/36; B23C 2210/045; B23C 5/06
See application file for complete search history.

(56) References Cited

U.S. PATENT DOCUMENTS

| | | | | |
|---|---|---|---|---|
| 5,904,450 | A * | 5/1999 | Satran | ............... B23C 5/202 407/113 |
| 2003/0045061 | A1 | 3/2003 | Kwon et al. | |
| 2003/0133763 | A1 | 7/2003 | Kuroda et al. | |
| 2004/0223818 | A1 * | 11/2004 | Sheffler | ............... B23C 5/109 407/48 |
| 2006/0013661 | A1 * | 1/2006 | Long, II | ............... B23B 27/1622 407/113 |
| 2010/0322732 | A1 * | 12/2010 | Mergenthaler | ........ B23B 51/048 408/229 |
| 2011/0274506 | A1 * | 11/2011 | Kakai | ............... B23C 5/109 407/40 |
| 2011/0299946 | A1 * | 12/2011 | Hecht | ............... B23C 5/207 407/42 |
| 2012/0009029 | A1 | 1/2012 | Saji | |
| 2012/0045289 | A1 * | 2/2012 | Ishi | ............... B23C 5/06 409/132 |
| 2012/0057943 | A1 * | 3/2012 | Zastrozynski | ............ B23C 5/06 407/30 |
| 2012/0070240 | A1 | 3/2012 | Ishi et al. | |
| 2012/0087749 | A1 * | 4/2012 | Uno | ............... B23C 5/06 407/42 |
| 2012/0189396 | A1 * | 7/2012 | Xu | ............... B23C 5/06 409/132 |
| 2012/0275868 | A1 * | 11/2012 | Saito | ............... B23C 5/06 407/42 |
| 2013/0045061 | A1 | 2/2013 | Ishi | |
| 2013/0101363 | A1 | 4/2013 | Yoshioka | |
| 2014/0161545 | A1 * | 6/2014 | Inagaki | ............... B23B 27/1603 407/42 |
| 2015/0139743 | A1 * | 5/2015 | Ballas | ............... B23C 5/109 407/48 |
| 2016/0158854 | A1 * | 6/2016 | Ishi | ............... B23C 5/207 409/131 |
| 2017/0008100 | A1 * | 1/2017 | Oikawa | ............... B23C 5/06 |
| 2017/0050249 | A1 * | 2/2017 | Oikawa | ............... B23C 5/10 |
| 2017/0291231 | A1 * | 10/2017 | Mao | ............... B23C 5/109 |
| 2017/0320146 | A1 * | 11/2017 | Ahnfeldt | ............... B23C 5/109 |
| 2017/0326656 | A1 * | 11/2017 | Saji | ............... B23C 5/109 |
| 2017/0326658 | A1 * | 11/2017 | Oikawa | ............... B23C 5/109 |
| 2018/0015554 | A1 * | 1/2018 | Roman | ............... B23C 5/109 |
| 2018/0036811 | A1 * | 2/2018 | Saji | ............... B23C 5/109 |
| 2018/0133813 | A1 * | 5/2018 | Brunetto | ............... B23C 5/207 |
| 2018/0339350 | A1 * | 11/2018 | Mura | ............... B23C 5/109 |
| 2019/0047059 | A1 * | 2/2019 | Shiroma | ............... B23C 5/109 |

FOREIGN PATENT DOCUMENTS

| | | |
|---|---|---|
| EP | 2489454 A1 | 8/2012 |
| EP | 2732891 A1 | 5/2014 |
| EP | 2743021 A1 | 6/2014 |
| JP | 59-50450 B2 | 12/1984 |
| JP | 2005-111651 A | 4/2005 |
| JP | 2010-069578 A | 4/2010 |
| WO | 2013/008565 A1 | 1/2013 |
| WO | 2014/007407 A1 | 1/2014 |

OTHER PUBLICATIONS

Written Opinion dated Mar. 31, 2015 issued in counterpart International (PCT) Application (No. PCT/JP2015/055479).

* cited by examiner

CUTTING INSERT AND CUTTING TOOL

RELATED APPLICATIONS

This is a 371 US National Phase of International Patent Application No. PCT/JP2015/055479 filed Feb. 25, 2015 and published as WO 2015/129769A1 on Sep. 3, 2015, which claims priority to JP 2014-034881, filed Feb. 26, 2014. The contents of the aforementioned applications are incorporated by reference in their entirety.

TECHNICAL FIELD

The present invention relates to a cutting insert for use in a cutting tool, and such cutting tool.

BACKGROUND ART

Patent Document 1 describes one example of conventional cutting inserts for use in high-feed machining. Such cutting insert for high-feed machining is a tool that realizes a high feed rate by setting a smaller cutting edge angle so as to make the resulting cutting chips thinner when the same feed rate applies and to thereby decrease a load to the cutting edge. In the recent years, simultaneous achievement of "high-feed machining" and "finishing (i.e., machining for making a smoothly machined surface for improved quality)" has been demanded in order to bring about further improvements in productivity.

CITATION LIST

Patent Document

Patent Document 1: JP2010-069578 A
Patent Document 2: JP5007853 B

SUMMARY

Technical Problem

The cutting insert disclosed in Patent Document 1 cannot sufficiently meet the demand to simultaneously achieve "high-feed machining" and "finishing." Providing the cutting insert with a cutting edge for improving surface roughness, which is called a wiper edge (also called a flat cutting edge), may be one option, but, in that case, it is necessary to determine the structure by sufficiently taking into consideration cutting resistance and other factors, which will be described below.

An object of the present invention is to provide a cutting insert capable of simultaneously achieving "high-feed machining" and "finishing."

Solution to Problem

According to a first aspect of the present invention, a cutting insert (10) is provided which has an upper surface (21), a lower surface (91), and a side surface (61) that connects the upper surface (21) and the lower surface (91), wherein: a cutting edge is formed at an intersecting edge between the upper surface (21) and the side surface (61); the cutting edge is at least comprised of a major cutting edge (33), a corner edge (34) connected to the major cutting edge (33), and an outwardly-curved wiper edge (35) located on the opposite side of the major cutting edge (33) across the corner edge (34); an angle θ made by the major cutting edge (33) and the chord of the wiper edge (35) is 155°≤θ<180°; and a land (41) is formed in the wiper edge (35), the land (41) being a positive land.

According to a second aspect of the present invention, a cutting insert (10) is provided which has an upper surface (21), a lower surface (91), and a side surface (61) that connects the upper surface (21) and the lower surface (91), wherein: a cutting edge is formed at an intersecting edge between the upper surface (21) and the side surface (61); the cutting edge is at least comprised of a major cutting edge (33), a corner edge (34) connected to the major cutting edge (33) and a linear wiper edge (35) located on the opposite side of the major cutting edge (33) across the corner edge (34); an angle θ made by the major cutting edge (33) and the wiper edge (35) is 155°≤θ<180°; and a land (41) is formed in the wiper edge (35), the land (41) being a positive land.

A third aspect of the present invention resides in a cutting tool comprising a cutting insert according to the first or second aspect of the present invention.

Advantageous Effects of Invention

Although the cutting insert according to the present invention has a cutting edge in a shape suitable for high-feed machining, it also has a wiper edge and can accordingly provide an improved finished surface roughness, as compared to conventional high-feed-rate cutting inserts. Furthermore, since the angle between the major cutting edge and the wiper edge is determined to be an appropriate value and also since a positive land involving a positive land angle is formed at the wiper edge, cutting resistance applied to the wiper edge is reduced. According to these configurations, when the cutting insert according to the present invention is mounted onto a cutting tool, the cutting tool can achieve stable machining.

DESCRIPTION OF EMBODIMENTS

Hereinafter, an embodiment of the present invention will be described with reference to the attached drawings. In the description in the specification, as well as in the scope of the claims of the present application, expressions including terms indicating a particular orientation in a space, such as "upper surface" and "lower surface," are used, but these expressions are used merely for convenience of description and are not intended to specify an absolute orientation or positional relationship in a space. Unless otherwise specified, the same also holds true when other terms indicating an orientation or positional relationship in a space, such as "high" and "low," are seen in the description.

Figure 1:
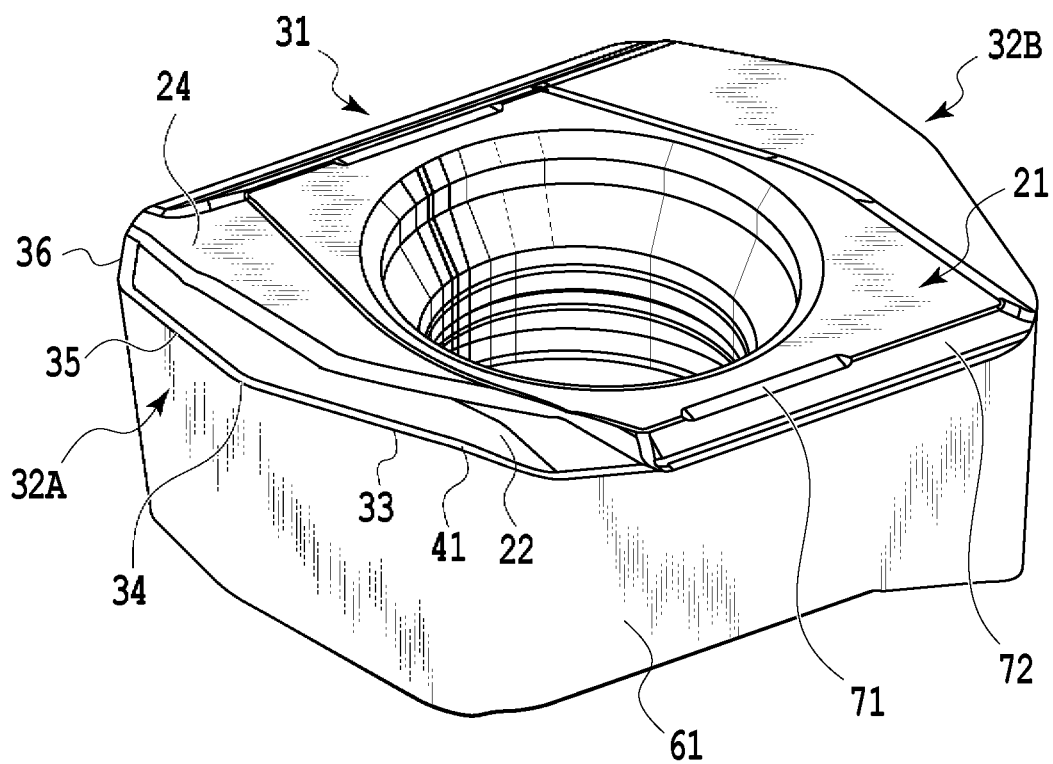
FIG. 1 is a perspective view of a cutting insert according to a first embodiment of the present invention as viewed from the top.
Figure 2:
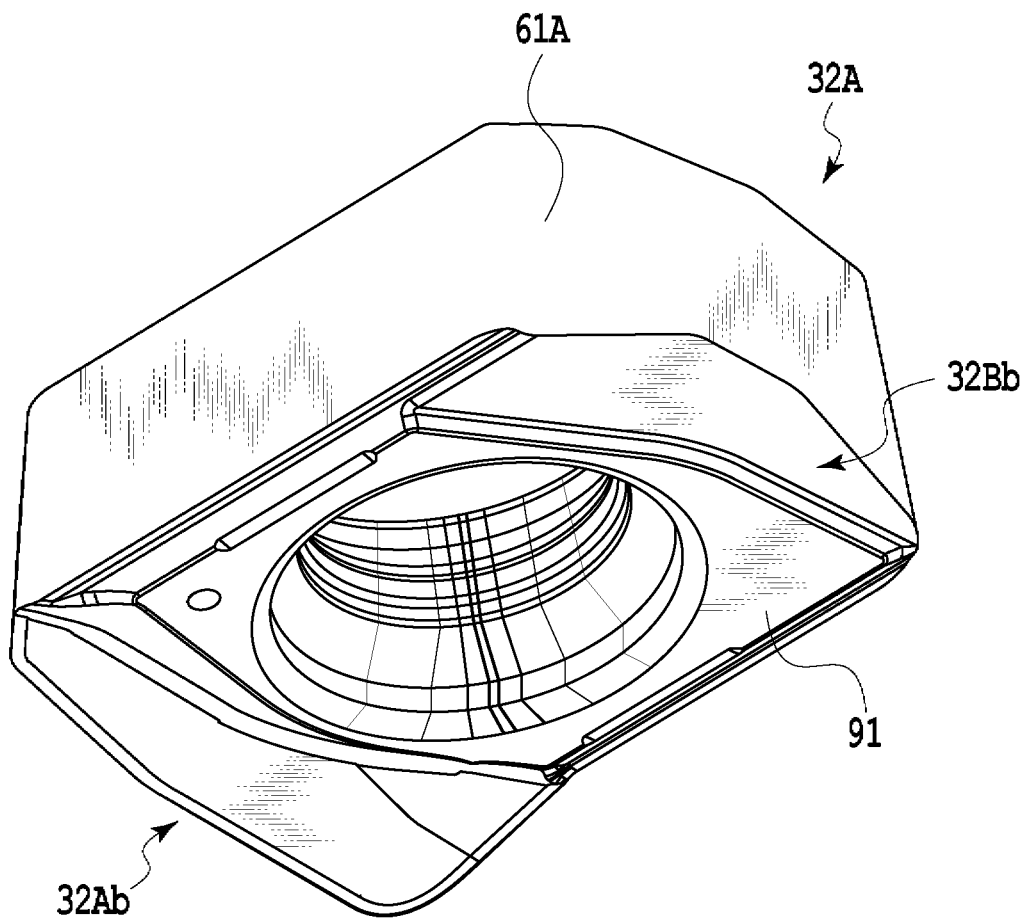
FIG. 2 is a perspective view of the cutting tool according to the first embodiment as viewed from the bottom.
Figure 3:
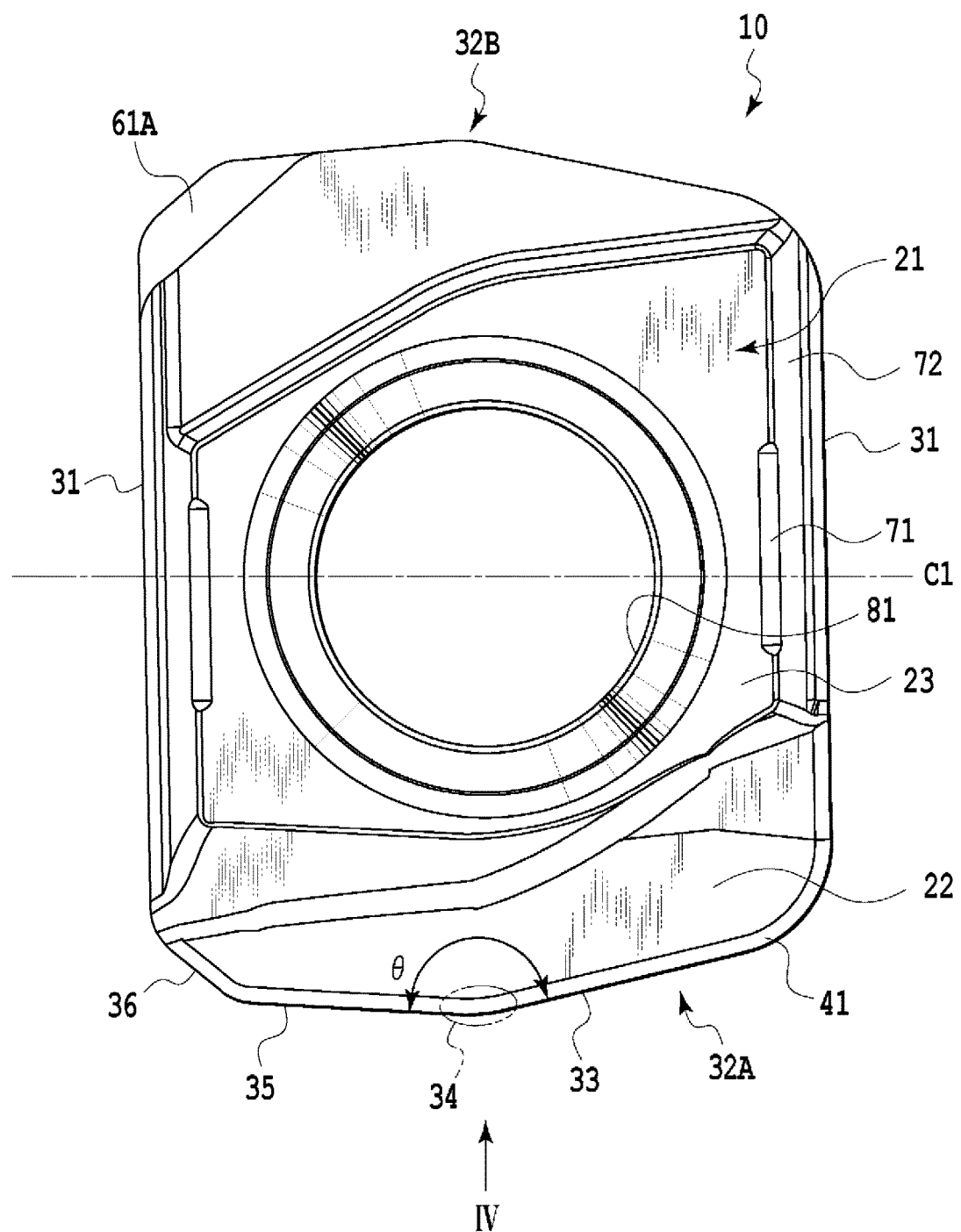
FIG. 3 is a top view of the cutting insert according to the first embodiment.
Figure 4:
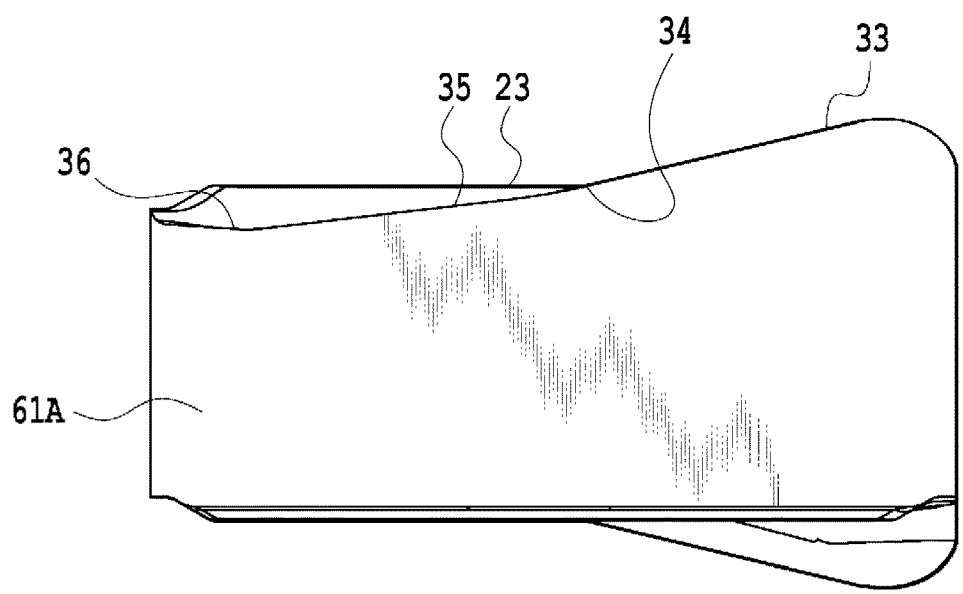
FIG. 4 is a side view of the cutting insert according to the first embodiment, illustrating the shape as viewed from the direction IV in FIG. 3.

FIG. 1 is a perspective view illustrating a first embodiment of a cutting insert according to the present invention. FIG. 2 is a perspective view of the cutting insert of FIG. 1 as viewed from another angle. FIG. 3 is a top view of the cutting insert of FIG. 1. FIG. 4 is a projection view of FIG. 3, showing the shape as viewed from the A-direction according to a reference arrow layout.

As illustrated in FIGS. 1 to 3, a cutting insert 10 is basically in a shape of a substantially rectangular cuboid, which is formed of an upper surface 21 and a lower surface 91 which are opposed to each other, each having a substantially rectangular shape with two long sides and two short sides, and a side surface 61 that connects the upper surface 21 and lower surface 91. To put it more precisely based on FIG. 3, which is a top view, a pair of long sides 31 of the upper surface 21 are formed so as to be parallel with each other, while the short sides 32A and 32B each include two bent portions and are composed of three divided sections. The long sides 31 are connected with the short sides 32A and 32B via smoothly curved portions.

The lower surface 91 has the same shape as that of the upper surface 21. A short side 32Ab (FIG. 2), which has the same shape as that of the short side 32A of the upper surface 21 illustrated in the lower part of FIG. 3, is formed on the reverse side of the short side 32B of the upper surface illustrated in the upper part of FIG. 3; whereas, a short side 32Bb (FIG. 2), which has the same shape as that of the short side 32B of the upper surface 21 illustrated in the upper part of FIG. 3, is formed on the reverse side of the short side 32A of the upper surface 21 illustrated in the lower part of FIG. 3. In other words, the cutting insert 10 has a 180° rotationally symmetrical shape about an axis C1, which is orthogonal to the axis of a through-hole 81 formed through the upper and lower surfaces and is also orthogonal to portions of the side surface 61 that include the long sides 31 of the upper surface 21.

No clearance angle is given to a majority of the side surface 61 that connects the upper surface 21 and the lower surface 91; however, side surface portions 61A which are connected to a part of the short side 32A of the upper surface 21 and a part of the short side of the lower surface 91 (these parts correspond to an "inner cutting edge," which will be described below) are given a certain clearance angle.

In the cutting insert 10, only the intersecting edge between the side surface 61 and the short side 32A, which is illustrated in the lower part of FIG. 3, is used as a cutting edge, and the intersecting edge between the side surface 61 and the long sides 31 or the short side 32B, which is illustrated in the upper part of FIG. 3, is not used as a cutting edge. The cutting insert 10 has one cutting edge in each of the upper surface 21 and the lower surface 91, so that the cutting insert 10 can be mounted on an insert seat of a body by rotating it 180° around the axis C1, i.e., one insert can be used twice. Since the cutting edge formed on the upper surface 21 and the cutting edge formed on the lower surface 91 have the same shape, the below description will be made only with respect to the cutting edge formed on the upper surface 21 and description of the cutting edge on the lower surface side will be omitted.

The cutting edge is composed of four sections—a major cutting edge 33, a corner edge 34, a wiper edge 35 and an inner cutting edge 36, and these are connected in this order to the curved portion illustrated in the lower right part of FIG. 3. The major cutting edge 33 is relatively long among the respective sections of the cutting edge, and machining is mainly achieved by this section. The wiper edge 35 is on the opposite side of the major cutting edge 33 across the corner edge 34, and has a circular arc shape which is gently curved outward. Specifically, the radius of curvature of the wiper edge 35 is 400 mm. The wiper edge 35 provides further finishing to the surface that has been machined by the major cutting edge 33 so as to improve the surface roughness in the finished surface. In the present embodiment, the angle θ formed by the major cutting edge 33 and the chord of the circular-arc wiper edge 35 is an obtuse angle, and more specifically, they intersect with each other at an angle θ of 165°. The inner cutting edge 36, which intersects with the wiper edge 35 at an obtuse angle, is substantially short relative to the major cutting edge 33 and the wiper edge 35, and, in cases of performing helical machining by moving the tool helically to cut or of performing slant machining by moving the tool downward in a slanting direction to cut, the inner cutting edge 36 contributes to the cutting at the rear side in the moving direction.

As shown in FIG. 3, the upper surface 21 has a land 41 which is formed adjacent to the cutting edge and also has a downward-inclined surface 22 which is formed adjacent to the land 41 so as to act as a rake surface. In a top view, the width of the land is significantly narrow relative to the width of the downward-inclined surface 22 and it is generally about ⅕ of the width of the downward-inclined surface 22, although it varies by location. In the cutting insert 10, the land 41 has a land angle which varies by location. More specifically, the land 41 which is adjacent to the major cutting edge 33 has a land angle of almost 0°, while the land 41 which is adjacent to the wiper edge 35 has a land angle of 8°. In other words, the land 41 of the major cutting edge 33 is a negative land and the land 41 of the wiper edge 35 is a positive land. Further, the land angle of the land 41 adjacent to the corner edge 34 gradually varies from 0° to 8° at an almost constant rate from the connecting point with the land 41 of the major cutting edge 33 to the connecting point with the land 41 of the wiper edge 35. The land 41 formed adjacent to the inner cutting edge 36 is also a positive land and its land angle is equal to the land angle in the wiper edge 35.

FIG. 4 is an illustration of the cutting insert 10 as viewed from the direction shown by the arrow IV in FIG. 3, i.e., from the direction facing the side surface 61 which forms the cutting edge together with the short side 32A. As illustrated in FIG. 4, the cutting edge is inclined in a direction heading from the major cutting edge 33 to the inner cutting edge 36 so as to approach the lower surface 91. In other words, when a contact surface 23, which is formed in the upper surface 21 as a surface to be brought into contact with an insert mounting seat of a body so as to mount the cutting insert on the insert mounting seat after 180° rotation about the axis C1, is regarded as a reference level, the cutting edge is inclined so that an end of the major cutting edge 33 is located higher than an end of the inner cutting edge 36. Further, as can be seen from the drawing, when the contact surface 23 is regarded as a reference level, a majority of the major cutting edge 33, except for a fairly limited portion close to the corner edge 34, is at a higher position than the contact surface 23; whereas, the entire portion of the wiper edge 35 is at a lower position than the contact surface 23.

A clearance angle is given to the side surface portion 61A that constitutes the inner cutting edge 36, as already described above. Furthermore, the upper surface 21 has the downward-inclined surface 22 which is formed adjacent to the land 41 and given a positive rake angle. Moreover, an inclined surface 72 is provided between the contact surface 23 and the long side 31 and a crack prevention inclined surface 71 is further formed along the intersecting edge between the inclined surface 72 and the contact surface 23. In the manufacture of a cutting insert formed of surfaces having a basically rectangular shape with two long sides and two short sides, like the cutting insert 10 in the present embodiment, in particular, when considering that such cutting insert is molded by sintering, it is preferable to increase the angle at the intersecting portion between the upper surface 21 and the inclined surface 72 in order to suppress the occurrence of cracks around the through-hole 81. Moreover, the occurrence of cracks during manufacture can be further effectively suppressed if the upper surface 21 and the inclined surface 72 are joined via the crack prevention inclined surface 71 having a chamfered shape, instead of joining them so that the above-described intersecting portion entirely serves as an edge line.

Next, a cutting tool on which the cutting insert 10 of the present embodiment is mounted will be described with reference to FIGS. 5 to 8. A substantially cylindrical body 100 has insert mounting seats 101 for mounting a cutting insert on the body 100, which are formed at equal intervals around the outer periphery of the leading end portion of the body 100. As shown in FIG. 7, the body 100 of the present embodiment has four insert mounting seats 101, in which the cutting insert 10 is mounted on one of the insert mounting seats 101 while an ordinary high-feed-rate cutting insert 200 having a minor cutting edge 39, which is an end cutting edge, in place of the wiper edge, is mounted on the remaining three seats, such cutting insert 200 being, for example, a cutting insert like the one disclosed in Patent Document 2.

Figure 5:
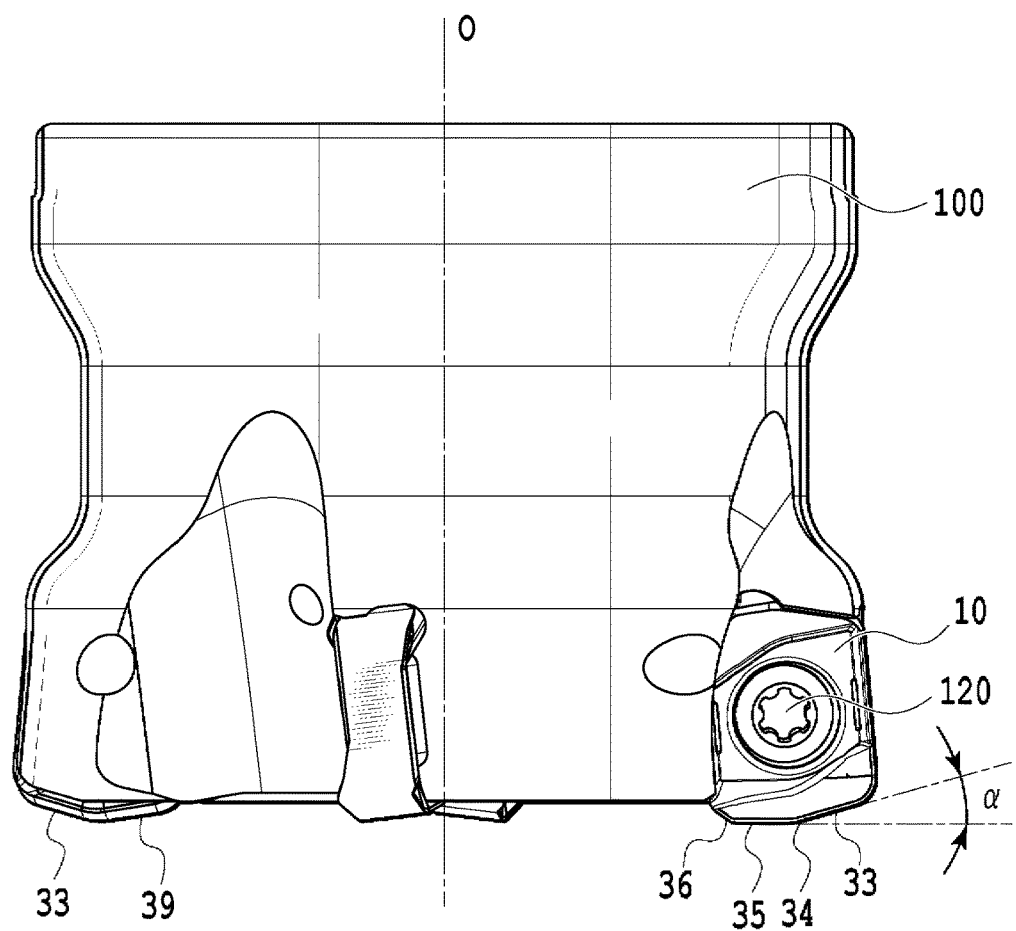
FIG. 5 is a side view of a cutting tool on which the cutting insert according to the first embodiment has been mounted.
Figure 6:
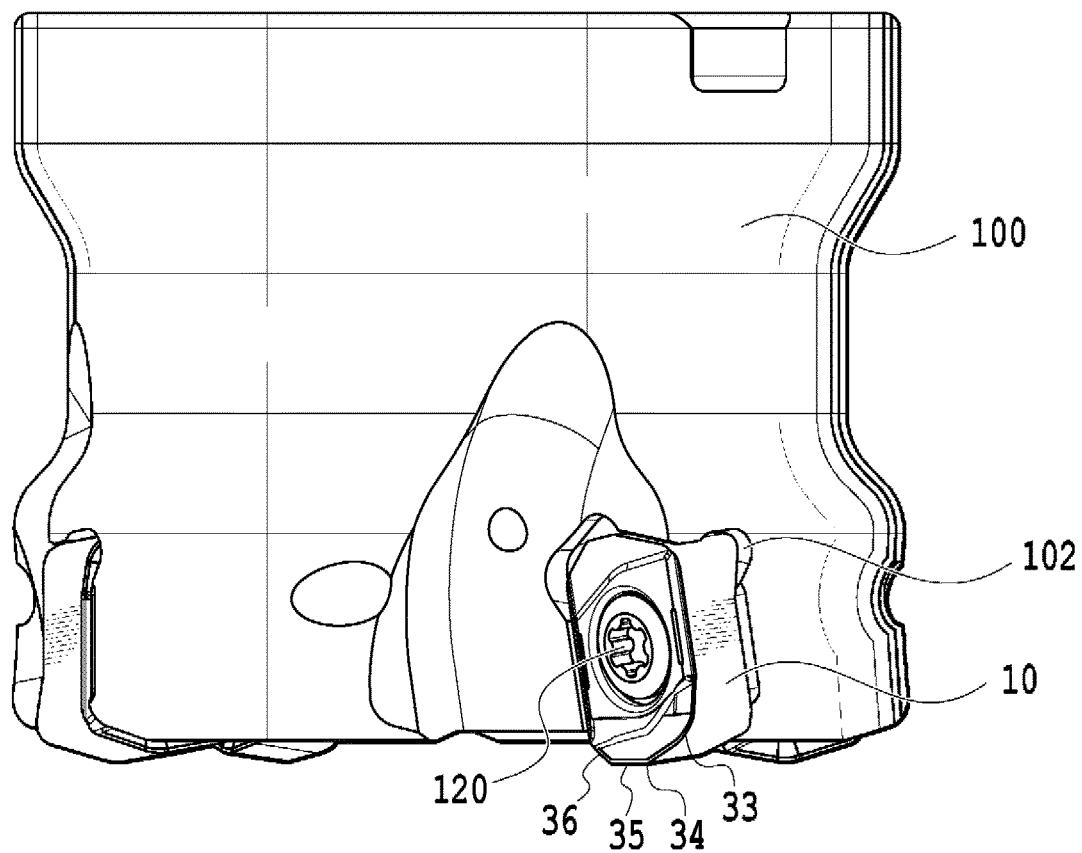
FIG. 6 is a side view of the cutting tool of FIG. 5 as viewed from another angle.
Figure 7:
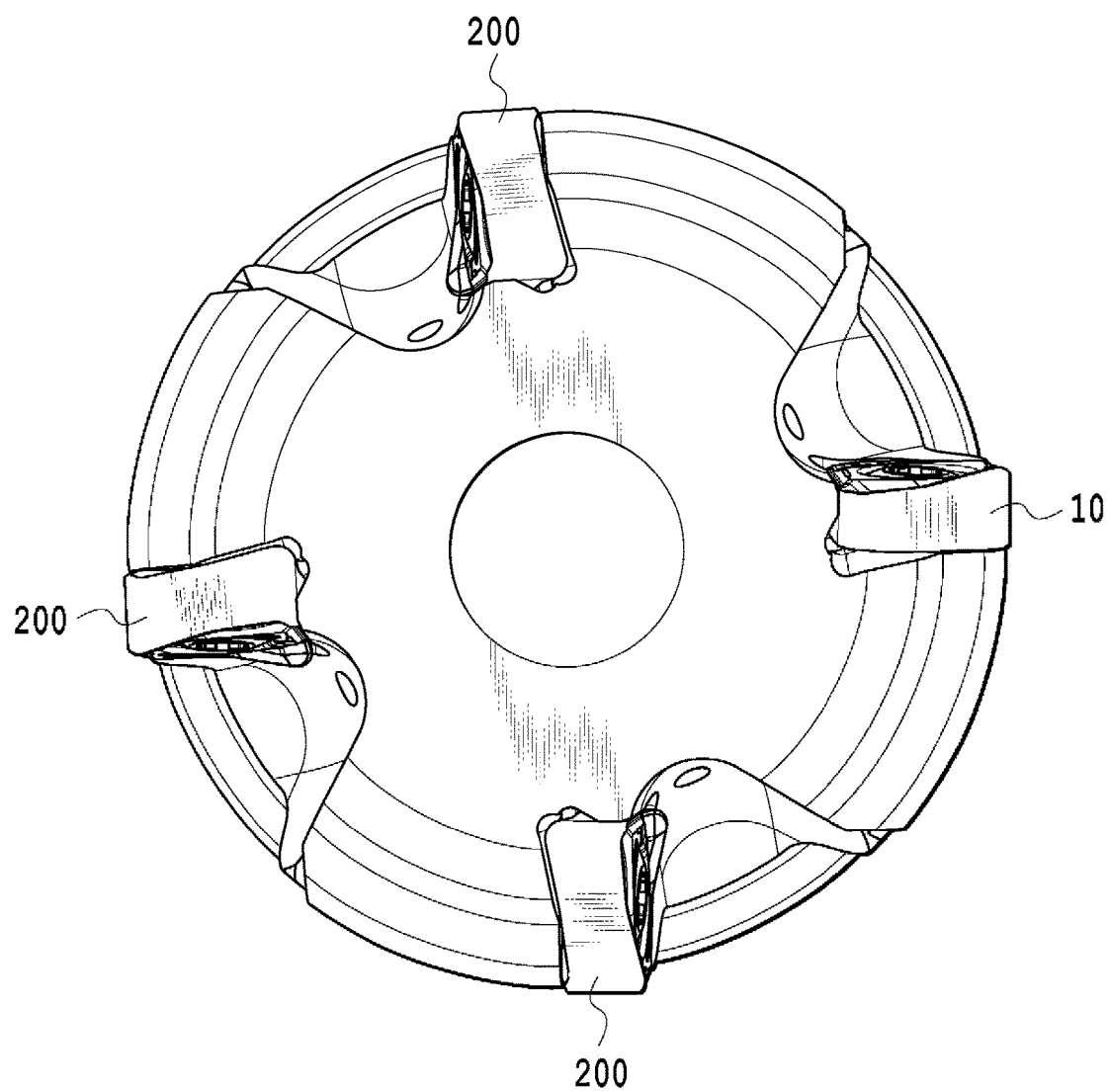
FIG. 7 is a bottom view of the cutting tool of FIG. 5.
Figure 8:
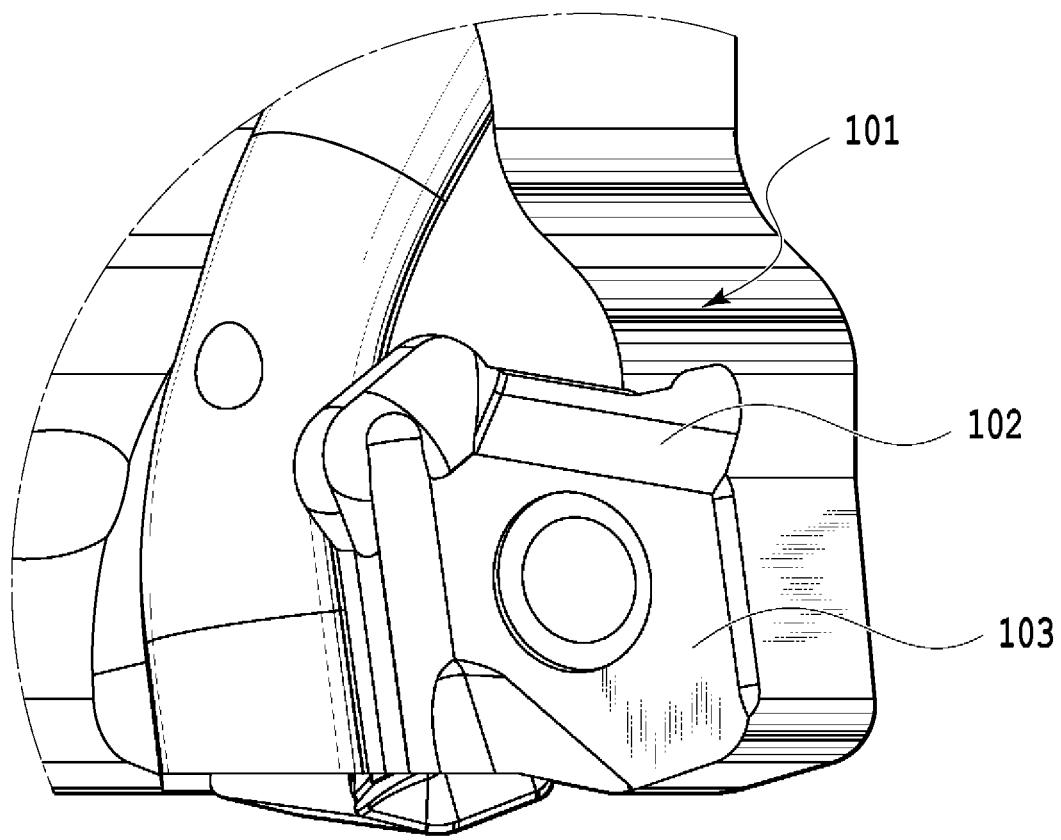
FIG. 8 is a perspective view showing an enlargement of an insert mounting seat in the cutting tool of FIG. 5.

The four cutting inserts are fixed to the respective insert mounting seats 101 with screws 120 as shown in FIGS. 5 and 6. As shown in FIG. 8, a protection groove 102 for protecting the unused cutting edge from cutting chips is formed adjacent to the bottom surface 103 of the insert mounting seat, which is brought into contact with the contact surface 23. This protection groove 102 is formed on the base end side of the body 100 with respect to the bottom surface 103 of the insert mounting seat. With this configuration, when the cutting insert 10 is mounted on the insert mounting seat 101, one of the cutting edges that is not involved with cutting is received in the protection groove 102 so that chipping, fracture, etc., which may occur due to contact with flying cutting chips, can be prevented. In particular, the cutting performance of the wiper edge 35 may be seriously affected by such chipping and fracture. Since the cutting insert 10 of the present embodiment has a 180° rotationally symmetrical shape about the axis C1, one of the wiper edges 35 which is not involved with cutting can be received at a center-side position of the body 100 so that it can be almost perfectly protected from contact with cutting chips.

The cutting insert 10 is mounted on the body 100 in such a manner that the wiper edge 35 can provide improved finished surface roughness in the surface of the workpiece. Specifically, the cutting insert 10 is mounted on the body 100 so that the chord obtained by connecting both ends of the wiper edge 35 is substantially parallel to a plane which is perpendicular to the rotational axis O of the body. In this mounting state, since the angle θ formed by the major cutting edge 33 and the chord of the wiper edge 35 is set to 165° in the present embodiment, the cutting edge angle α of the major cutting edge 33 is 15°, as shown in FIG. 5, which is a value smaller than those of rotating tools other than high-feed-rate cutting inserts. As described before, the wiper edge 35 has a gently curved circular-arc shape. The cutting tool of the present embodiment is a high-feed tool and thus has a high feed rate per cutting edge, which is about 1.0 mm. Moreover, as also described before, only one of the four cutting inserts used includes the wiper edge 35. Accordingly, such wiper edge 35 can provide a favorable finished surface with a very high feed rate per cutting edge, namely, about 4.0 mm. Specifically, when the wiper edge 35 is formed in a circular-arc shape, the wiper edge 35 is set to have a greatly large radius of curvature, e.g., 400 mm, so that cutting is conducted by substantially the entire region of the wiper edge 35. Since the side surface 61 connected to the major cutting edge 33, the corner edge 34 and the wiper edge 35 is given a clearance angle of 0°, the cutting insert 10 is mounted on the body 100 in such a state that it is inclined forward in the direction of rotation of the tool so as to avoid contact between the side surface 61 and the workpiece.

It should be noted that the number of insert mounting seats provided in the cutting tool and the number of cutting inserts having a wiper edge to be mounted are not limited to those in the present embodiment, and can be determined by taking the balance between an increase of cutting resistance and finishing accuracy into consideration. In other words, what is needed is a configuration in which at least one cutting insert having a wiper edge is mounted on a cutting tool provided with a plurality of insert mounting seats.

Now, the effects provided by the cutting insert 10 will be described. Unlike conventional high-feed-rate cutting inserts, the cutting edge of the cutting insert 10 includes the wiper edge 35, and, as a result, the finished surface roughness can be improved as compared to machining using conventional cutting inserts. A high-feed-rate cutting insert usually has a small cutting edge angle with its major cutting edge and, accordingly, when the cutting resistance applied to the cutting edge is decomposed into principal force, thrust force and feed force, the proportion of the thrust force is higher than that in a cutting insert other than such high-feed-rate cutting insert. Thus, further providing a wiper edge 35 in such a high-feed-rate cutting insert would result in an excessive thrust force. It seems that this is the reason that the idea of providing a wiper edge in a high-feed-rate cutting insert has not been proposed before. In this regard, however, the inventors have increased the cutting sharpness by forming a positive land adjacent to the wiper edge 35, as in the cutting insert 10 of the present embodiment, so as to make a sharp edge. As a result, the present inventors have succeeded in suppressing, wherever possible, an increase of the thrust force due to the provision of the wiper edge 35. In addition, the present inventors have strengthened the major cutting edge 33, which bears a major part of the machining and to which a relatively large load is applied, by forming a negative land adjacent to the major cutting edge 33. As a result, the present inventors have also succeeded in making the major cutting edge 33 less prone to chipping or fracture.

The wiper edge provided in the cutting insert 10 may be a linear edge. However, the wiper edge 35 in the present embodiment has a circular-arc shape and, with this configuration, the wiper edge 35 can still properly come into contact with the workpiece even if a certain change occurs in the state of placement of the cutting insert 10 onto the insert mounting seat 101 due to, for example, variations arising from manufacturing errors. In other words, if, for example, the cutting edge angle α, which is set to 15° in the above-described embodiment, has changed to 14.5° for some reason, the inner part of the tool will be distant from the workpiece and cannot be involved in cutting if the wiper edge is linear; whereas, the contact state with the workpiece will not substantially change if the wiper edge has a circular arc shape. In this respect, a circular-arc shape wiper edge has advantages over a linear wiper edge.

According to the basic idea of the present invention, the cutting edge may not necessarily have an inner cutting edge 36. However, by providing an inner cutting edge 36, the cutting insert 10 has an improved capability to respond to machining other than face milling, such as helical machining and slant machining, as described before. In other words, the cutting insert 10 of the present embodiment can achieve various types of machining, in addition to simultaneously achieving high-feed machining and finishing. Moreover, a clearance angle is given at the side surface portion 61A of the inner cutting edge 36 and a positive land is further formed adjacent to the inner cutting edge 36, so that the inner cutting edge 36 has a sharp edge and the cutting resistance is accordingly reduced.

Since the entire part of the major cutting edge 33 in the cutting insert 10 is located at a higher level than the contact surface 23, the thickness of the cutting insert increases as compared to usual cutting inserts, leading to improved durability. On the other hand, the wiper edge 35 is located at a lower level than the contact surface 23 and, accordingly, even if the cutting insert 10 is mounted on the body 100 so as to have a negative radial rake angle, the wiper edge 35 does not protrude forward in the tool rotating direction T relative to the major cutting edge 33. With this configuration, it is possible to suppress chipping, fracture, etc., of the wiper edge 35, which may occur due to the wiper edge 35 preceding the major cutting edge 33 during cutting.

Since the downward-inclined surface 22 that provides a positive rake angle is formed in the vicinity of the wiper edge 35, the cutting insert does not generate cutting chips as if they were forcibly cut out from the workpiece, even though the flank clearance angle of the wiper edge 35 is set to 0°. In other words, the downward-inclined surface 22 provides a positive rake angle and, even if the cutting insert 10 is mounted on the body 100 so as to be slightly inclined forward in the tool rotating direction by taking into consideration the material of the workpiece, the rotation speed of the cutting tool, etc., the downward-inclined surface 22 does not prevent cutting chips from flowing away when a positive axial rake angle is provided in the downward-inclined surface 22. Due to the above, cutting chips are smoothly separated from the workpiece. In addition, since the cutting chips are smoothly separated off, the cut surface has better gloss.

The present invention has been described above by showing one embodiment of the invention as an example. However, the present invention can be modified in various ways other than the above-described embodiment. For example, the radius of curvature of the wiper edge 35 in the above-described embodiment is 400 mm, but it can be changed as appropriate according to the size of the cutting insert, etc., to the extent that the wiper edge 35 can effectively serve as a wiper edge. The present inventors have confirmed that if the radius of curvature of the wiper edge 35 is within the range of 100 mm or more and 450 mm or less, the wiper edge 35 will be sufficiently effective as a wiper edge for a high-feed tool. The present inventors have also confirmed that the wiper edge 35 is particularly effective when the radius of curvature is within the range of 100 mm or more and 200 mm or less. In addition, the shape of the wiper edge 35 is not limited to a curved shape, such as a circular-arc shape, and it may be a linear shape.

The angle θ made by the major cutting edge 33 and the chord of the wiper edge 35 is 165° in the above-described embodiment; however, the present inventors have confirmed that sufficient effects can be obtained if the angle θ made by the major cutting edge 33 and the chord of the wiper edge 35 falls within the range of 155°≤θ<180°.

Regarding the land in each of the cutting edges, the above-described embodiment is configured such that the wiper edge 35 has a positive land with an angle of 8° while the major cutting edge 33 has a negative land with an angle of 0°; however, the present inventors have confirmed that sufficient effects can be obtained if the angle of the land for the wiper edge 35 is greater than 0° and less than or equal to 10°, and the angle of the land for the major cutting edge 33 is −1° or more and 0° or less.

Although the major cutting edge 33, the corner edge 34, the wiper edge 35 and the inner cutting edge 36 are continuously connected in the above-described embodiment, each of these cutting edges may be shaped so as not to be connected directly with one another. For example, a minor linear cutting edge may be formed between the major cutting edge 33 and the corner edge 34 so as to intersect with the major cutting edge 33 at an obtuse angle.

What is claimed is:

1. A cutting insert (10) comprising an upper surface (21), a lower surface (91), and a side surface (61) that connects the upper surface (21) and the lower surface (91), wherein:
    a cutting edge is formed at an intersecting edge between the upper surface (21) and the side surface (61);
    the cutting edge is at least comprised of a major cutting edge (33), a corner edge (34) connected to the major cutting edge (33), and an outwardly-curved wiper edge (35) located on an opposite side to the major cutting edge (33) with respect to the corner edge (34);
    an angle θ made by the major cutting edge (33) and a chord of the wiper edge (35) is 155°≤θ<180°; and
    a land (41) is formed in the wiper edge (35), the land (41) being a positive land.

2. The cutting insert according to claim 1, wherein a negative land is formed in the major cutting edge (33), the negative land having a land angle of −1° or more and 0° or less.

3. The cutting insert according to claim 1, wherein the wiper edge (35) has a radius of curvature within a range of 100 mm or more and 450 mm or less.

4. The cutting insert according to claim 1, wherein the wiper edge (35) has a radius of curvature within a range of 100 mm or more and 200 mm or less.

5. The cutting insert according to claim 1, wherein:
    the cutting insert has a generally rectangular shape in a top view,
    the side surface (61) comprises opposing first and second side portions connected to opposing first and second end portions;
    a first cutting edge is formed at an intersecting edge between the first end portion of the side surface (61) and one short side (32A) of the upper surface (21), and
    a second cutting edge is formed at an intersecting edge between the second end portion of the side surface (61) and one short side (32Ab) of the lower surface (91).

6. A cutting tool comprising the cutting insert (10) according to claim 1.

7. The cutting tool according to claim 6, comprising a cylindrical body (100), wherein the body (100) has a plurality of insert mounting seats (101) disposed around an outer periphery at a leading end portion of the body (100) and wherein the cutting insert (10) is mounted on at least one of the plurality of insert mounting seats (101).

8. The cutting insert (10) according to claim 1, wherein:
the corner edge (34) has a land with a land angle which gradually varies from 0° to 8° from a connecting point with a land (41) of the major cutting edge (33) to a connecting point with the land (41) of the wiper edge (35).

9. The cutting insert (10) according to claim 1, wherein:
the cutting insert has a generally rectangular shape in a top view;
the upper surface (21) has a pair of short sides (32A, 32B) connected by a pair of long sides (31);
the lower surface (91) has a pair of short sides (32Ab, 32Bb) connected by a pair of long sides (31);
the insert has 180° rotational symmetry around a symmetry axis (C1) passing through the pair of long sides (31);
a through hole (81) passes between the upper surface (21) and the lower surface (91), the through hole (81) having a through hole axis which is perpendicular to the symmetry axis (C1); and
the insert lacks 180° rotational symmetry about the through hole axis.

10. A cutting insert (10) comprising an upper surface (21), a lower surface (91), and a side surface (61) that connects the upper surface (21) and the lower surface (91), wherein:
a cutting edge is formed at an intersecting edge between the upper surface (21) and the side surface (61);
the cutting edge is at least comprised of a major cutting edge (33), a corner edge (34) connected to the major cutting edge (33), and a linear wiper edge (35) located on an opposite side to the major cutting edge (33) with respect to the corner edge (34);
an angle θ made by the major cutting edge (33) and the wiper edge (35) is 155°≤θ<180°;
a land (41) is formed in the wiper edge (35), the land (41) being a positive land; and
the cutting edge further comprises an inner cutting edge (36), the inner cutting edge (36) being located on an opposite side to the corner edge (34) with respect to the wiper edge (35).

11. The cutting insert according to claim 10, wherein a negative land is formed in the major cutting edge (33), the negative land having a land angle of −1° or more and 0° or less.

12. The cutting insert (10) according to claim 10, wherein:
the corner edge (34) has a land with a land angle which gradually varies from 0° to 8° from a connecting point with a land (41) of the major cutting edge (33) to a connecting point with the land (41) of the wiper edge (35).

13. The cutting insert (10) according to claim 10, wherein:
the inner cutting edge (36) has a positive land provided with a land angle equal to a land angle of the positive land (41) formed in the wiper edge (35).

14. The cutting insert (10) according to claim 10, wherein:
the cutting insert has a generally rectangular shape in a top view;
the upper surface (21) has a pair of short sides (32A, 32B) connected by a pair of long sides (31);
the lower surface (91) has a pair of short sides (32Ab, 32Bb) connected by a pair of long sides (31);
the insert has 180° rotational symmetry around a symmetry axis (C1) passing through the pair of long sides (31);
a through hole (81) passes between the upper surface (21) and the lower surface (91), the through hole (81) having a through hole axis which is perpendicular to the symmetry axis (C1); and
the insert lacks 180° rotational symmetry about the through hole axis.

15. The cutting insert according to claim 14, wherein:
the inner cutting edge (36) has a positive land provided with a land angle equal to a land angle of the positive land (41) formed in the wiper edge (35);
a negative land is formed in the major cutting edge (33), the negative land having a land angle of −1° or more and 0° or less; and
the corner edge (34) has a land with a land angle which gradually varies from 0° to 8° from a connecting point with a land (41) of the major cutting edge (33) to a connecting point with the land (41) of the wiper edge (35).

16. The cutting insert according to claim 10,
the cutting insert has a generally rectangular shape in a top view,
the side surface (61) comprises opposing first and second side portions connected to opposing first and second end portions;
a first cutting edge is formed at an intersecting edge between the first end portion of the side surface (61) and one short side (32A) of the upper surface (21), and
a second cutting edge is formed at an intersecting edge between the second end portion of the side surface (61) and one short side (32Ab) of the lower surface (91).

17. The cutting insert according to claim 10, wherein
an angle made by the inner cutting edge (36) and the wiper edge (35) is smaller than the angle θ made by the major cutting edge (33) and the wiper edge (35);
the wiper edge (35), the corner edge (34) and the major cutting edge (33) are inclined in a direction heading to the inner cutting edge (36) so as to approach the lower surface (91); and
a clearance angle is given to a portion (61A) of the side surface (61), the portion (61A) forming the inner cutting edge (36).

* * * * *